June 3, 1969 E. H. KELBER 3,447,267

GRINDING APPARATUS AND METHOD

Filed Feb. 13, 1967 Sheet 1 of 3

EDWARD H. KELBER
INVENTOR.

BY Lyon & Lyon
ATTORNEYS

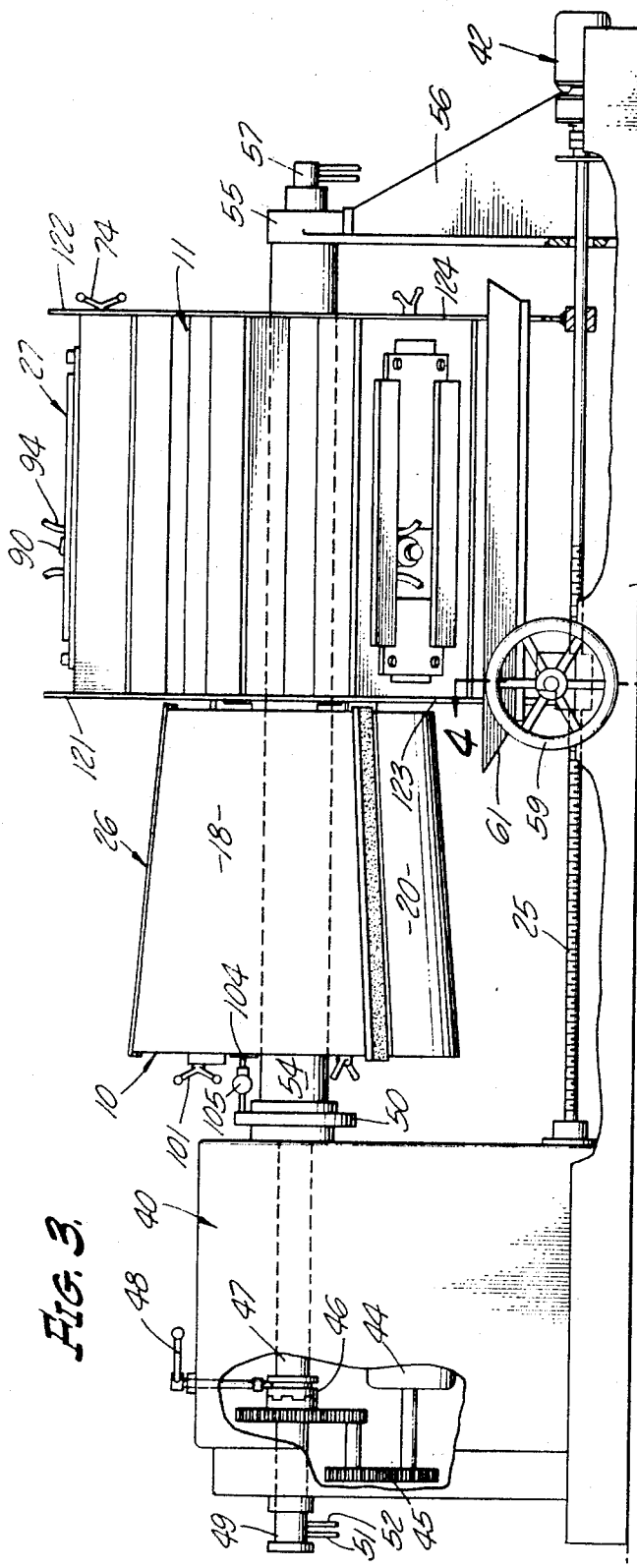

June 3, 1969  E. H. KELBER  3,447,267
GRINDING APPARATUS AND METHOD
Filed Feb. 13, 1967  Sheet 3 of 3
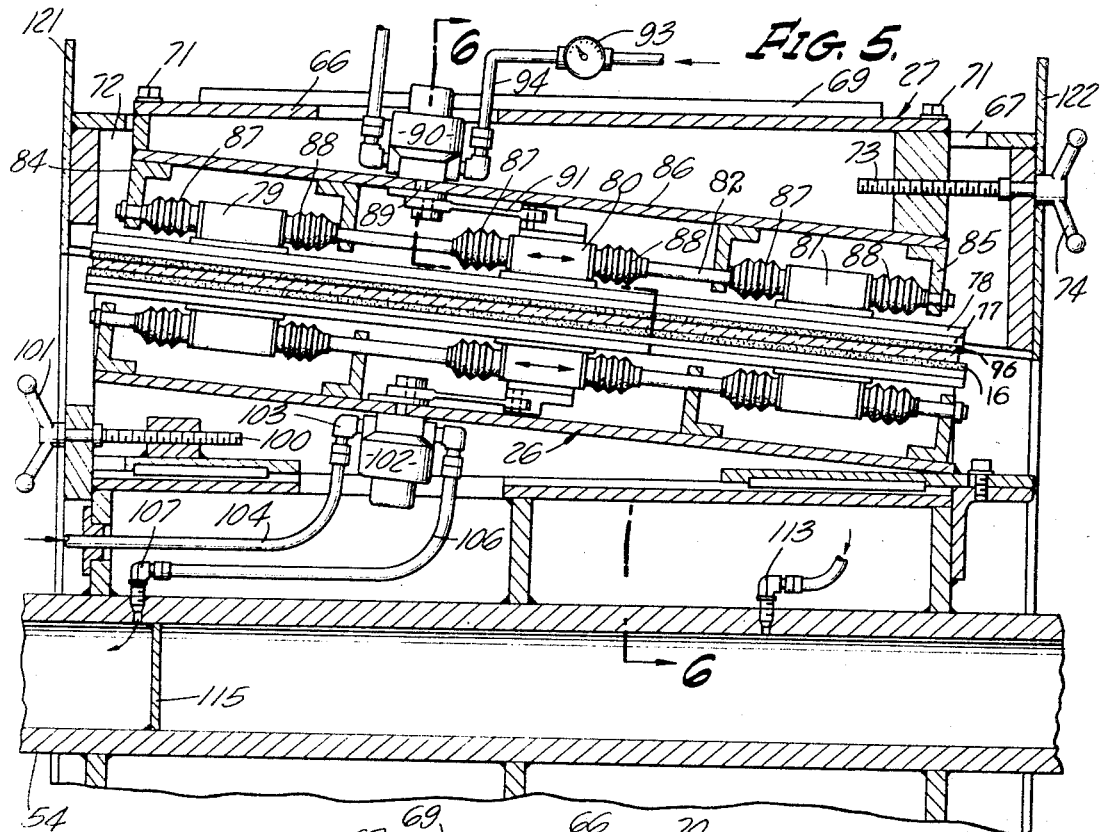
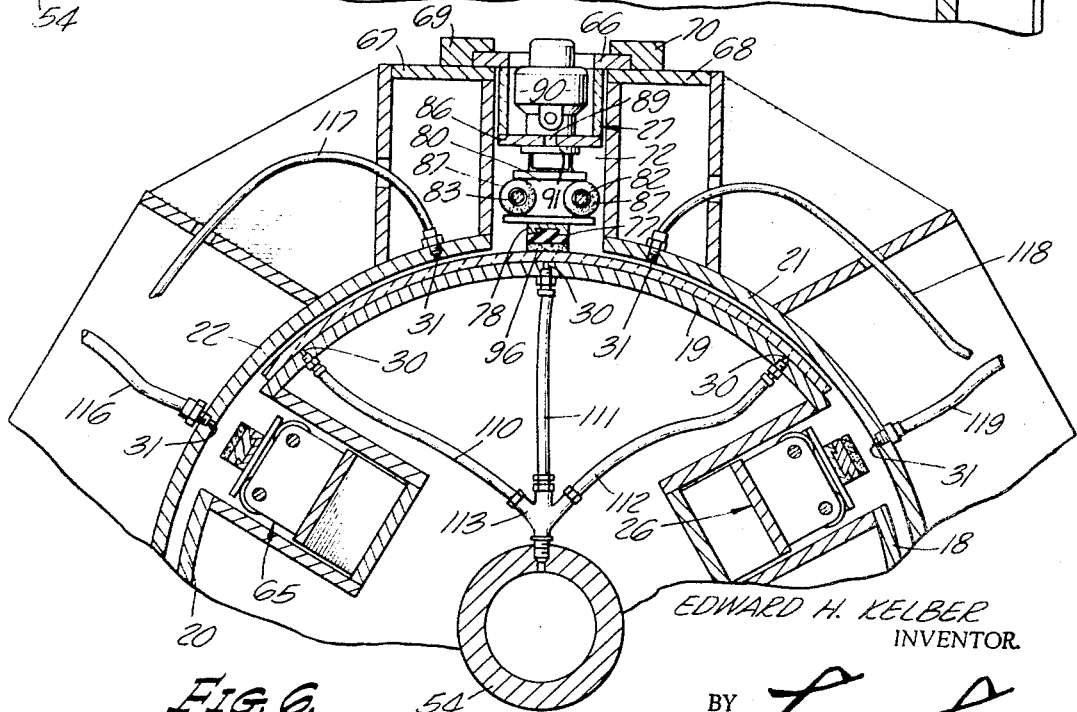
EDWARD H. KELBER
INVENTOR.
BY Lyon & Lyon
ATTORNEYS United States Patent Office 3,447,267
Patented June 3, 1969

3,447,267
GRINDING APPARATUS AND METHOD
Edward H. Kelber, Stanton, Calif., assignor to Swedlow Inc., Garden Grove, Calif., a corporation of California
Filed Feb. 13, 1967, Ser. No. 615,593
Int. Cl. B24b 11/00, 9/08
U.S. Cl. 51—3                    10 Claims

ABSTRACT OF THE DISCLOSURE

An apparatus and method whereby one surface of a curved member, such as a portion of an aircraft windshield, is supported while a second surface thereof is ground and polished by a compound action, and then supported on the second surface while the first is ground and polished in a similar manner. An apparatus for accomplishing the grinding and polishing may include male and female mandrels which are essentially coaxially mounted and are relatively rotatable. Both mandrels carry reciprocating grinding elements.

Background and summary of the invention

The present invention relates to a grinding and polishing method and apparatus, and is particularly directed to close tolerance grinding and polishing of parts, such as plastic windshield parts or windshield segments of aircraft. The invention is particularly applicable to the finishing of the opposite surface of a curved acrylic windshield part parallel to each other within close tolerances, but the invention also is applicable to other grindable plastics and glass. Typical military jet aircraft employ laminated acrylic windshields formed from spherical or conical sections or parts. Because of the problem of multiple images, which are perceived by the pilot for example during landing on an aircraft carrier, the opposite surfaces of the windshield must be parallel within close tolerances. Presently, the windshield parts are formed from flat sheets which are ground and polished to make the surfaces parallel, and then the finished sheets are laminated and formed into the desired configuration, e.g., spherical, conical, etc. Although suitable windshield sections can be manufactured in this manner, it is relatively time consuming and difficult to do so and provide a section with the surfaces parallel within close tolerances.

According to an exemplary embodiment of the present invention, a curved part which is either monolithic or laminated is ground and polished on one surface by a compound grinding action while the second surface is supported by a similarly curvey member, and then the first surface is similarly supported as the second surface is similarly ground and polished. In accordance with an exemplary apparatus for carrying out the concepts of the present invention, relatively movable male and female members have respective exterior and interior surfaces of a configuration the same as the part to be ground and polished. The two members are mounted coaxially, carry reciprocating grinding elements, and are relatively rotatable. For example, one or more parts are mounted on the exterior surface of the male member, and the male member is rotated within the female member while the grinding elements of the female member grind and polish the exposed surface of the part or parts. The parts are then supported within the female member, and the male member is again rotated and the grinding elements thereof grind and polish the now exposed second surface of the part or parts. In this manner, the two opposing surfaces of the part or parts may be ground and polished parallel simply and within close tolerances.

Accordingly, it is an object of this invention to provide a new method and apparatus for grinding surfaces of a part.

It is another object of this invention to provide a new and novel apparatus for accurately grinding and polishing surfaces of one or more curved parts.

Another object of this invention is to provide an apparatus for accurately grinding surfaces of curved windshield sections which are formed of plastic.

A further object of this invention is to provide an improved method for accurately grinding and polisihng surfaces of curved parts.

Brief description of the drawings

These and other objects, features and advantages of the present invention will be better understood from a consideration of the following description taken in conjunction with the drawings in which:

FIGURE 3 is an elevational view of an apparatus according to the present invention;

FIGURE 4 is a cross-sectional view taken along a line 4—4 of FIGURE 3;

FIGURE 5 is a partial cross-sectional view illustrating a portion of the male and female members of the apparatus shown in FIGURE 3 and the grinding elements thereof;

FIGURE 6 is a partial cross-sectional view taken along a line 6—6 of FIGURE 5; and FIGURE 7 is a view of a portion of a grinding element.

Description

Figure 1:
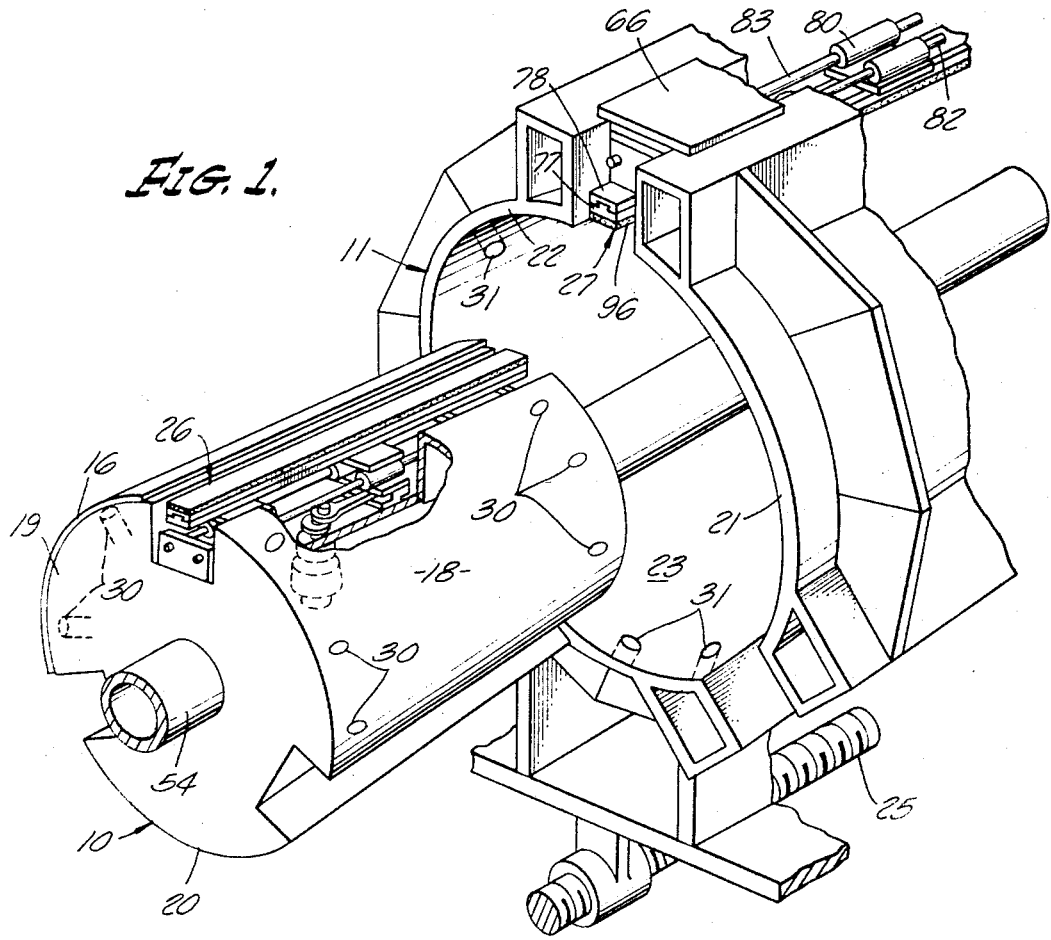
FIGURE 1 is a perspective view of a portion of an apparatus according to the present invention for accurately grinding and polishing surfaces of curved parts.
Figure 2:
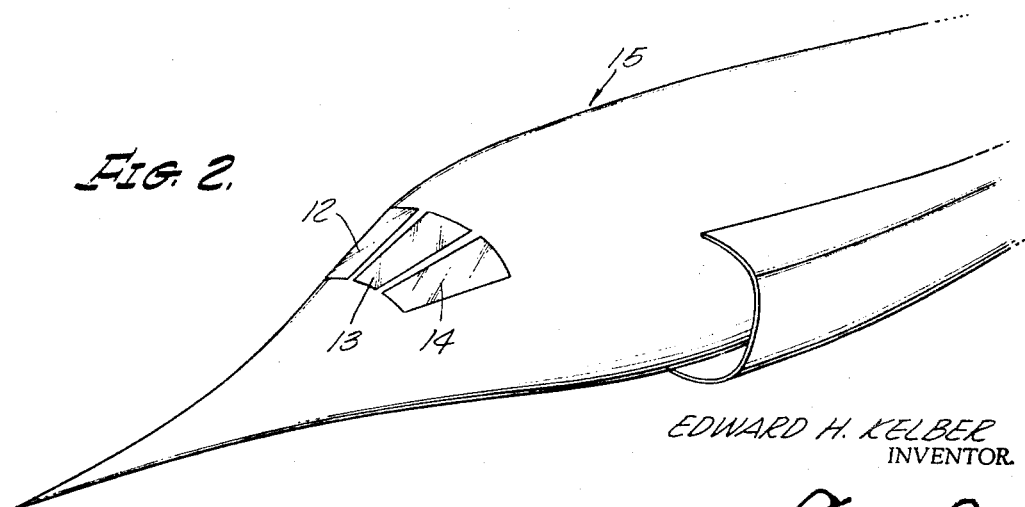
FIGURE 2 is a partial perspective view of an aircraft generally illustrating typical windshield sections which may be formed in accordance with the teachings of the present invention.

Referring now to the drawings, FIGURE 1 is a simplified partial perspective view illustrating an exemplary apparatus according to the present invention. The apparatus is essentially in the form of a lathe having male and female mandrels 10 and 11, respectively, for holding three conical segments or parts, such as 12 through 14 of an aircraft 15 shown in FIGURE 2. Only one windshielf part 16 is shown in FIGURE 1 for clarity of illustration. The male mandrel 10 is frusto-conical, although it may take other forms, such as cylindrical, and three sections 18 through 20 receive three parts to be ground and polished. The female mandrel 11 includes corresponding sections 21 through 23. The male mandrel 10 is rotatable, and the female mandrel 11 is stationary but can be moved over the male mandrel 10 by a lead screw 25. Each of the mandrels has three grinding elements mounted thereon, only elements 26 and 27 of the respective mandrels 10 and 11 being shown for simplicity of illustration. The grinding elements can be operated to reciprocate back and forth essentially in the direction of the central axis of the two mandrels.

The parts to be ground typically are each laminated acrylic plastic sheets which have been formed to the desired configuration, e.g., conical. One mandrel holds the parts while the grinding elements of the other mandrel serve to grind and polish the exposed surfaces of the parts and vice versa. In the past the finishing of the surfaces of the parts generally has been performed by hand on flat sheets which subsequently are laminated and formed to the required shape.

In accordance with the present invention, the parts are mounted on the respective sections 18 through 20 of the male mandrel 10 and are held thereon in a conventional manner by a vacuum applied through small openings, such as openings 30, in the surface of the mandrel. The female mandrel 11 is then moved over the male mandrel 10 and the parts mounted thereon by means of the lead screw 25. The male mandrel 10 is rotated, and the grinding elements on the female mandrel reciprocate thereby grinding the exposed sufaces of the parts. After grinding, the rotation of the male mandrel 10 is stopped, the grinding pads are changed, and the exposed surfaces are polished. Rotation of the male mandrel 10 is again stopped and vacuum applied to the parts is removed. A vacuum is applied through small openings, such as 31, in the female mandrel 11 to secure the parts to the respective sections 21 through 23 thereof. With the parts thus secured within the female mandrel 11, the male mandrel 10 again is rotated and its grinding elements reciprocate thereby grinding the inside or opposite surface of the parts. Again, the grinding pads are changed and the inside surfaces are polished. After the surfaces of the parts are polished, the female mandrel 11 is removed by means of the lead screw 25 and the parts are removed from the apparatus. The surfaces of each part thus easily can be finished parallel with a total variation within only several thousandths of an inch.

Typically, abrasive pads are used for grinding, and a felt pad along with a slurry of gritty material, such as various grits of serium oxide, are used for polishing. Both the rotation of the male mandrel 10 and speed of reciprocation of the grinding elements preferably are slower during grinding and faster during polishing. Generally, a plurality of parts, such as three, are finished at the same time; however, fewer parts can be mounted and finished by appropriately counterweighing the male mandrel 10 while the parts are secured thereto. Instead of grinding and polishing one surface and then the other, the first surface may be ground, followed by the second, followed by polishing the second surface and then the first. For precision finishing, the entire apparatus preferably is secured to a sturdy base, such as a separate reinforced floor section of a building, and isolated from vibrations caused by other adjacent or remote equipment. The chucking surfaces of the segments 18 through 20 and 21 through 22 of the respective male and female mandrels are accurately machined to enable the precision finishing of parts and preferably have a several thousandths inch flash of hard chromium, and the mandrels are maintained in proper alignment.

FIGURES 3 through 7 illustrate the apparatus of FIGURE 1 in greater detail. FIGURE 3 is an elevational view of the entire apparatus, and illustrates the male mandrel 10, the female mandrel 11, a driving mechanism 40 for the male mandrel, a supporting bed 41, and a driving mechanism 42 for the lead screw 25. The driving mechanism 40 includes a motor 44, such as a twenty horsepower electric motor, coupled through gearing 45 and a sliding gear clutch 46 to a spindle shaft 47. A handle 48 is coupled with the clutch 46 and facilitates changing the gear ratio of the gearing 45, and several variations may be provided to give a wide speed range, for example from a few r.p.m., up to several hundred r.p.m., for the male mandrel. As will appear subsequently, the grinding elements are operated by hydraulic motors, and hydraulic unions 49 and 50 are coupled with the spindle shaft 47 to allow hydraulic lines 51 and 52 to be coupled through the shaft to hydraulic lines coupled with the grinding element motors of the mandrel 10.

The union 50 is coupled to one end of a drive shaft 54 to which the male mandrel 10 is affixed, and the other end of this shaft is mounted in a bearing member 55 supported by an end member 56 which is in turn affixed to the bed 41. A rotating union 57 is coupled at this end of the shaft 54 for supplying a vacuum to the sections 18 through 20 of the male mandrel 10. This union also may supply water as a lubricant during grinding and polishing.

The female mandrel 11 is mounted on a pair of ways, only one way 58 being seen in FIGURE 4, affixed to the bed 41, and is moved over the male mandrel 10 by rotation of the lead screw 25. The lead screw 25 is rotated by an electric motor driving mechanism 42, and fine adjustment of the position of the female mandrel 11 may be accomplished by rotation of a hand wheel mechanism 59 which is coupled through gearing 60 to the lead screw 25. A drip pan 61 is mounted below the female mandrel 11, and provides a receptacle and drain for any water or abrasive slurry used during the grinding and polishing operations. An apparatus as shown in FIGURE 3 for finishing conical windshield segments for aircraft, for example, may be approximately thirty-three feet long and nine feet high, and the large end of the male mandrel 10 has a diameter of approximately five feet.

The grinding elements of the male and female mandrels are illustrated in greater detail in FIGURES 5 through 7. FIGURE 5 illustrates the grinding elements 26 and 27 in an aligned position; whereas these elements are shown displaced from one another in FIGURE 6 which illustrates another grinding element 65. Each of the grinding elements on both the mandrels is alike and, thus, only the grinding element 27 will be explained in detail. The grinding element 27 has a top flange 66 slidably secured on plates 67 and 68 by brackets 69 and 70 and nuts 71, and fits within a receptacle 72 in the female mandrel 11. The bolts 71 may be loosened to allow longitudinal adjustment of the element by an adjusting screw 73 coupled thereto and to a handle 74. The longitudinal dimension, for example, of the female mandrel 11 as viewed in FIGURE 5 may be approximately six feet. A total longitudinal travel of, for example three inches, may be provided by the adjusting screw 73 to cause the grinding mechanism 27 to effectively move in and out radially with respect to the male mandrel to thereby provide proper engagement with the surface of the part 16 being finished. This adjustment also allows the grinding element to be withdrawn when the female mandrel 11 is being moved by the lead screw 25.

The grinding element 27 includes a rubber pad 77 and aluminum pad holder 78 affixed to pairs of ball bushing housings 79 through 81. A pair of steel shafts 82 and 83 extend through respective ones of the pairs of ball bushing housings and are affixed to and supported by brackets 84 and 85 secured at the ends of a stationary cover 86 of the grinding element. Each housing has, for example, four ball bushings therein, and flexible protectors, such as protectors 87 and 88, are coupled at each end of each ball bushing housing to keep fluids and abrasives from the insides thereof. A shaft 89 (note also FIGURE 7) of a hydraulic motor 90 is eccentrically coupled to a lever arm 91 which in turn is affixed to the pair of ball bushing housings 80. The motor 90 and arm 91 cause the housings 79 and 81 to reciprocate thereby causing the pad 77 and holder 78 to reciprocate. A line pressure gage 93 is coupled to the inlet 94 of the motor 90. Similar pressure gages are coupled with the other two grinding elements of the female mandrel 11, and these three gages enable the hydraulic motors of all three grinding elements of the female mandrel to be balanced at an equal input pressure. Since the female mandrel does not rotate, it is not necessary to use rotating unions to convey hydraulic fluid, water and vacuum thereto.

For grinding, an abrasive pad 96 is affixed to the rubber pad 77. For example, 100 grit resin bonded pressure sensitive adhesive sanding pads three inches wide may be used along with water lubrication. For polishing, a one-half inch felt pad may be affixed to the rubber pad 77, and used with a slurry or serium oxide and enough water to keep the felt pad wet.

As noted above, the three grinding elements on each mandrel are constructed and operated in a similar manner, and each has a pressure gage coupled with the hydraulic motor thereof. Also, the grinding elements on the male mandrel 10 are each adjustable. FIGURE 5, for example, illustrates an adjusting screw 100 and handle 101 coupled with the grinding element 26 to adjust the element in the same manner as the element 27. The hydraulic motor 102 of the grinding element 26 has an inlet 103 coupled through a line 104 to a pressure gage 105 (note FIGURE 3) like the pressure gage 93. The hydraulic fluid return line 106 is coupled through a fitting 107 and the interior of the shaft 54 back to the hydraulic fluid supply (not shown).

Vacuum lines are provided for each of the sections 18 through 20 and 21 through 23 of the male and female mandrels, respectively, to provide suitable suction through holes in the surfaces thereof for retaining the parts on the respective mandrels. For example, three vacuum lines 110 through 112 are shown coupled with a fitting 113 which in turn communicates through the interior of the shaft 54 with the union 57 (note FIGURE 3). A baffle 115 is provided within the shaft 54 as shown in FIGURE 5 to separate the hydraulic fluid and vacuum chambers thereof. Several vacuum lines 116 through 119 of the female mandrel 11 are shown in FIGURE 6.

Plastic covers 121 through 124 (note FIGURES 3 and 5) may be slidably mounted on the top and bottom of both ends of the female mandrel to cover the ends thereof during the grinding and polishing operations. Rubber protectors (not shown) similar to the protectors 87 and 88 preferably are provided over the entire length of the lead screw 25, and covers may be provided over the ways of the bed 41, to protect the lead screw and ways from fluid abrasives.

The present embodiment of this invention is to be considered in all respects as illustrative and not restrictive, the scope of the invention being indicated by the appended claims rather than by the foregoing description and all changes which come within the meaning and range of equivalency of the claims therefore are intended to be embraced therein.

What is claimed is:

1. Apparatus for finishing first and second surfaces of a part comprising
    first mandrel means having a plurality of sections each having a surface upon which a first of said surfaces of a part may be mounted, element means mounted between said sections, said element means having a finishing member for engaging a second of said surfaces of said part and which may be reciprocated in a plane substantially parallel to the surfaces of said sections,
    second mandrel means having a plurality of sections each having a surface upon which a second surface of a part may be mounted, element means mounted between said sections of said second mandrel means, said element means of said second mandrel means having a finishing member for engaging a first surface of said last named part and which may be reciprocated in a plane substantially parallel to the surfaces of the sections of said second mandrel means,
    means for coaxially mounting said first and second mandrel means one within the other, and
    means for imparting relative rotation to said first and second mandrel means.

2. Apparatus for finishing first and second surfaces of a curved elongated part comprising
    male mandrel means having a plurality of spaced sections each having a surface upon which one of said surfaces of a part may be mounted, element means mounted between respective sections, each of said element means having a finishing member for engaging a second of said surfaces of said part and which may be reciprocated in a plane substantially parallel to the surfaces of said sections,
    female mandrel means having a plurality of spaced sections each having a surface upon which the second surface of said part may be mounted, element means mounted between respective sections of said female mandrel means, each of said element means of said female mandrel means having a finishing member for engaging said second surface of said part and which may be reciprocated in a plane substantially parallel to the surfaces of the sections of said second mandrel means,
    means for coaxially mounting said female mandrel means about said male mandrel means, and
    driving means for imparting relative rotation to said male and female mandrel means.

3. Apparatus as in claim 2 wherein
    said male mandrel means comprises a rotatable mandrel having a curved periphery defining the surfaces of the spaced sections thereof, and having receptacles between said sections thereof within which the element means of the male mandrel means are mounted,
    said female mandrel means comprises an open mandrel having a curved periphery defining the surfaces of the spaced sections thereof, and having receptacles between said sections thereof within which the element means of the female mandrel means are mounted,
    each of the element means of said male and female mandrel means comprising a supporting member upon which a finishing member is movably mounted, and motor means coupled with the finishing member thereof for reciprocating the finishing member.

4. Apparatus as in claim 3 wherein
    said means for coaxially mounting said female mandrel means about said male mandrel means comprises bed means for rotatably supporting said rotatable mandrel and for movably supporting said open mandrel for movement about or away from said rotatable mandrel.

5. Apparatus as in claim 3 wherein
    said rotatable mandrel is frusto-conical and includes three spaced sections, and the interior of said open mandrel has a configuration for substantially mating with the peripheral surfaces of said male mandrel and has three spaced sections.

6. Apparatus for finishing first and second surfaces of curved parts comprising
    a male mandrel having a curved periphery defining a plurality of mounting surfaces upon which a first surface of said parts may be mounted, said male mandrel being rotatable about the axis thereof, a plurality of finishing means mounted on said male mandrel and being reciprocal in a plane substantially parallel to a surface of said mandrel for finishing a second surface of said parts,
    a female mandrel having a curved interior defining a plurality of mounting surfaces upon which the second surface of said parts may be mounted, a plurality of finishing means mounted on the interior of said female mandrel and being reciprocal in a plane substantially parallel to a surface of said female mandrel for finishing the first surface of said parts, and
    bed means for rotatably supporting said male mandrel and for supporting said female mandrel to enable said female mandrel to be moved over said male mandrel, said bed means including driving means for rotating said male mandrel.

7. Apparatus as in claim 6 wherein
    said surfaces of said male and female mandrels are divided into a plurality of sections by receptacles, said mounting surfaces being the surfaces of said sections, intermediate said receptacles, and
    said finishing means of each mandrel comprising a motor driven finishing member mounted within the respective receptacles thereof, each of said finishing members having a finishing pad member mounted thereon for engaging one of said surfaces of said parts.

8. Apparatus as in claim 7 wherein
    each of said mandrels has three spaced mounting surfaces, and each mandrel has a like number of finishings means mounted in the receptacles thereof.

9. A method of finishing first and second surfaces of a curved part comprising the steps of
- supporting said part on the first surface thereof,
- engaging a second surface of said part with a finishing element and imparting relative rotation between said finishing element and said part in the direction of curvature of the part, and reciprocating said finishing element in a direction substantially parallel to the axis of rotation,
- supporting said part on the second surface thereof, and
- engaging said first surface with a finishing element and imparting relative rotation between said last named finishing element and said part in the direction of curvature of said part, and reciprocating said last named finishing element in a direction substantially parallel to the axis of rotation.

10. A method of finishing first and second surfaces of a plurality of curved elongated parts comprising the steps of
- supporting each of said parts on a first surface thereof,
- engaging a second surface of said parts with a grinding element and imparting relative rotation between said grinding element and said parts in the direction of curvature of the parts, and reciprocating said grinding element in a direction substantially parallel to the axis of rotation,
- supporting each of said parts on the second surface thereof, and
- engaging said first surface of said parts with a grinding element and imparting relative rotation between said last named grinding element and said parts in the direction of curvature of said parts, and reciprocating said last named grinding element in a direction substantially parallel to the axis of rotation.

References Cited

UNITED STATES PATENTS 2,807,916  10/1957  Squire et al. _____ 51—3 X

FOREIGN PATENTS 694,082  7/1940  Germany.
1,004,127  9/1965  Great Britain.

JAMES L. JONES, Jr., *Primary Examiner.*

U.S. Cl. X.R.

51—34